United States Patent [19]

Peace

[11] Patent Number: 4,463,664
[45] Date of Patent: Aug. 7, 1984

[54] BEVERAGE WARMING APPARATUS

[76] Inventor: Paul W. Peace, P.O. Box 241, Norman Park, Ga. 31771

[21] Appl. No.: 359,685

[22] Filed: Mar. 19, 1982

Related U.S. Application Data

[63] Continuation-in-part of Ser. No. 131,795, Mar. 20, 1980, abandoned.

[51] Int. Cl.³ .............................................. A23F 3/00
[52] U.S. Cl. .................... 99/323.3; 126/390; 219/433
[58] Field of Search ................ 99/323.3, 279, 275; 219/439, 430, 438, 433, 432; 126/373, 390, 261, 246, 400; 215/13 R

[56] References Cited

U.S. PATENT DOCUMENTS 1,157,991 10/1915 Linton .................................. 126/390
1,425,371 8/1922 Desmarest .......................... 126/390
2,764,974 10/1956 Gottfried ............................ 126/390

FOREIGN PATENT DOCUMENTS 370226 4/1939 Italy .................................... 126/373

Primary Examiner—Robert W. Jenkins
Attorney, Agent, or Firm—Jones & Askew

[57] ABSTRACT

An insulated drinking cup for a heated beverage, and a warmer for maintaining the cup and beverage at an elevated temperature suitable for drinking. The cup includes a heat-conductive inner liner having a base portion and a wall portion, surrounded by a thermally nonconducting insulating sleeve. The warmer includes a heating element for direct contact with the bottom portion of the inner liner. The sleeve of the cup includes an inner shell and an outer shell, and an open annular region therebetween which insulates the interior of the cup, and which also receives heat from the warmer when supported thereon.

9 Claims, 2 Drawing Figures

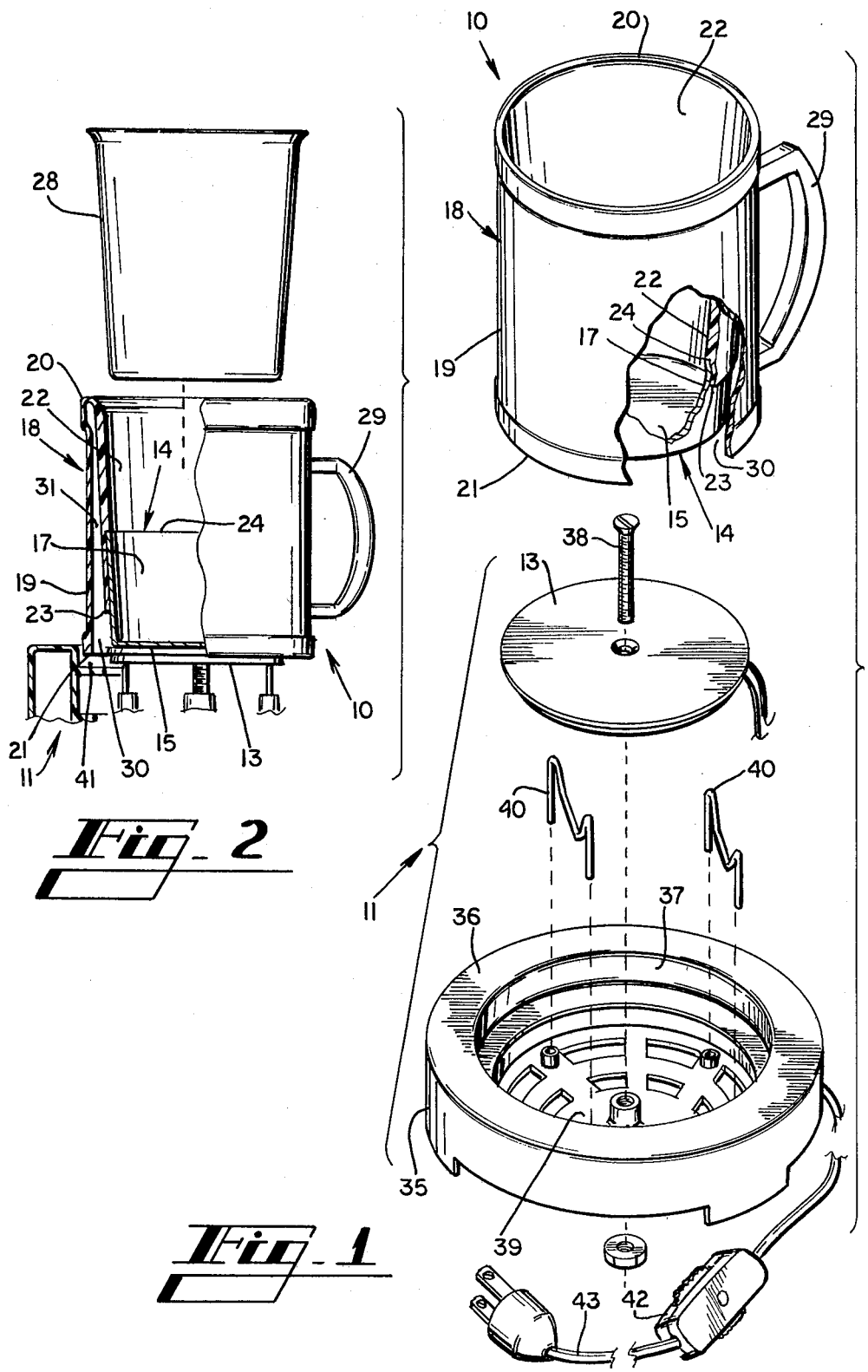

BEVERAGE WARMING APPARATUS

CROSS-REFERENCE TO RELATED APPLICATION

This is a continuation-in-part of Ser. No. 131,795, filed Mar. 20, 1980 and now abandoned.

TECHNICAL FIELD

The present invention relates to liquid receptacles such as drinking cups, and more particularly relates to a beverage container and warmer which warms a consumable liquid contained therein and maintains the temperature of the beverage.

BACKGROUND ART

Hot beverages such as coffee or cocoa are best enjoyed when consumed at a particular serving temperature range. A desired serving temperature usually cannot be maintained in the drinking cup, because the hot beverage is rapidly cooled by conduction heat transfer into the cup or other vessel and by convection to the surrounding atmosphere. Beverages served at drinking temperature soon cool to an unpalatable temperature, and beverages served at a hotter temperature can burn the drinker's mouth.

Insulated drinking vessels for liquid and semi-liquid foods are well known in the prior art. In the prior art, however, insulated vessels have included insulation surrounding the entire bottom and sides of the vessel. Thus, although such prior art insulated vessels act to retard loss and resulting cooling of liquid within the vessel, it is impossible to maintain the temperature of a liquid in the drinking vessel by using a surface heating unit such as a hot plate. The insulation on the bottom and side portions of prior art vessels would prevent heat from a hot plate from reaching the liquid within the vessel. Furthermore, some types of insulating material found on prior-art cups and other drinking vessels would melt on contact with a hot plate or other surface heat source.

Thus, a need has existed in the art for beverage cup apparatus capable of keeping a beverage warm, and also capable of transferring heat directly to the liquid contained therein from a surface-type heat source.

SUMMARY OF THE INVENTION

Generally described, the present invention provides a receptacle having a thermally nonconductive exterior to retain the heat of liquids, and having a durable heat-conductive interior portion to reside in heat-conductive relation with a source of warming heat, so as to impart heat to the contents of the receptacle. Stated somewhat more specifically, the receptacle comprises a heat-conductive liner including a bottom portion and an upwardly extending wall portion, and a heat-insulating sleeve surrounding the wall portion of the liner, the bottom portion of the liner being exposed for direct contact with a heat source. The nonconductive sleeve surrounding the wall portion of the conductive liner has an open bottom which terminates a short distance below the bottom portion of the liner in surrounding yet spaced apart relation to the bottom portion, in order to isolate the sleeve from the heat source.

The sleeve surrounding the liner preferably defines an open region between the sleeve and the wall portion of the liner. This open region provides an air space to help retain heat in the liner, and open at the bottom to trap and collect warm air rising from the heat source on which the cup is supported.

The present invention includes a warmer on which the receptacle removably is supported. The warmer has a heated surface for applying heat directly to the bottom portion of the heat-conductive liner, and also has an open region around the heated surface to accommodate the bottom of the nonconductive sleeve.

Accordingly, it is an object of the present invention to provide an improved beverage warming apparatus.

It is another object of the present invention to provide an insulated liquid receptacle that can be placed directly on a heat source to warm the liquid contained therein.

Another object of the present invention is to provide an insulated beverage cup which retains heat of a heated liquid contained therein, and which can directly receive heat from a separate heat source to maintain the liquid at a drinking temperature.

Another object of the present invention is to provide beverage warming apparatus including a liquid receptacle having a thermally conductive liner within a nonconductive exterior, and also including a warmer which directly heats the conductive liner.

Other objects, features and advantages of the present invention will become apparent upon consideration of the following specification, when taken in conjunction with the drawing.

BRIEF DESCRIPTION OF THE DRAWING

FIG. 1 is a pictorial view of beverage warming apparatus including a cup shown partially broken away and a warmer shown exploded for illustrative purposes, according to a disclosed embodiment of the invention.

FIG. 2 is a fragmentary plan view of the disclosed embodiment, shown partially broken away.

DETAILED DESCRIPTION OF DISCLOSED EMBODIMENT

Referring now in more detail to the drawing, FIG. 1 shows a pictorial view of an insulated beverage cup 10, with a portion of the cup broken away to reveal its interior construction. The cup 10, which is designed to rest on a heat element 13 of a warmer 11 and which is shown above the warmer in FIG. 1, includes a heat conductive liner 14 preferably made of a metal such as aluminum or the like. The liner 14 is generally cup-shaped, and includes a base or bottom portion 15 and an upwardly extending wall portion 16. The bottom portion 15 is flat so that it can be received on the heat element 13 of the warmer 11, and the upwardly extending wall portion 16 is tapered slightly outwardly in the shape of a truncated cone.

Surrounding and affixed to the liner 14 is an insulating sleeve 18. The sleeve 18 may be made of any suitable relatively rigid and thermally nonconductive material, such as insulating foam or an appropriate unfoamed plastic. The terms "nonconductive" and "heat conductive" as used herein are meant to be relative terms, respectively denoting materials having relatively poor and relatively good heat transfer characteristics. The sleeve 18 includes an outer annular shell 19, extending downwardly from an upper annular lip 20 at the top of the cup 10 to the open annular bottom end 21. The sleeve 18 also includes an inner shell 22 joined to the outer shell 19 at the upper annular lip 20, and extending downwardly within the cup to a lowermost inner edge 23 surrounding the upper end 17 of the upwardly extending wall portion on of the heat conductive liner 14.

The upper end 17 of the conductive liner 14 is spaced upwardly a distance from the lower inner edge 23 of the inner shell 22, and as best seen in FIG. 2 the inner shell may include a recessed lower portion receiving the wall portion 16 of the conductive liner so that the liner upper end 17 joins the inner shell 22 along a circular joinder line 24 which is substantially smooth within the interior of the cup 10. The inner shell 22 may taper slightly inwardly and downwardly from the upper annular lip 20 at an angle complementary to the aforementioned taper of the upwardly extending wall portion 16, thus providing a substantially smooth taper of the cup 10 which readily receives a removable cup insert 28, FIG. 2. The cup insert preferably is of a non-insulating material such as relatively thin paper or rigid unfoamed plastic, and may be an inexpensive disposable cup of a kind and size readily available at grocery stores and the like.

The sleeve 18 preferably is a unitary article formed by molding or the like, so that the outer shell 19 and inner shell 22 each extend downwardly from the upper annular lip 20. A conventional handle 29 is molded or otherwise attached to the outer shell 19, and it will be appreciated that the upper end of the cup insert 28 normally projects substantially above the annular upper lip 20 of the cup so as to facilitate inserting and removing the cup insert. It will also be appreciated that the conductive liner 14 preferably is permanently affixed to the unitary sleeve 18 by any suitable technique such as molding, adhesive bonding, or the like.

The bottom edge 21 of the outer shell 19 extends downwardly a distance slightly below the bottom portion 15 of the liner 14, as best seen in FIG. 2. This bottom edge 21 also is circumferentially spaced outwardly a distance from the bottom portion 15, thereby defining an open annular space 30 radially disposed between the liner bottom and the radially-surrounding bottom edge 21. Moreover, the tapered inner shell 22 is slightly spaced apart from the outer annular shell 19 of the sleeve 18, further defining the open annular region 31 between the inner and outer shells making up the sleeve. It will be appreciated from FIG. 2 that the annular region 31 is in communication with the open region 30 surrounding the bottom portion 15 of the conductive liner within the bottom 21 of the sleeve. The combined spaces 30 and 31, together with the thermally nonconducting inner and outer shells making up the sleeve 18, serve to insulate the major portion of the cup 10 from unwanted heat conduction through the side of the cup.

The warmer 11 includes a base 35 having an upper face 36, and having an open interior region 37 within which the heating element 13 is mounted. The heating element 13 preferably is a conventional plate-type electric heating element secured to the base 35 by a bolt 38 extending downwardly through the heating element and through an opening in the bottom 39 of the base. A pair of spacer elements 40 extend upwardly from the bottom of the base 35 to support the heating element 13 in spaced-apart relation to the bottom, thereby preventing the heating element from melting or otherwise damaging the base. As seen in FIG. 2, the heating element 13 is spaced radially inwardly from the upper face 36 of the base 35, so that the heating element does not directly contact any portion of the base. It will be understood that the base 35 may be a unitary article molded from a suitable plastic material.

Referring again to FIG. 2, with the cup 10 supported in place on the warmer 11, it is seen that the bottom portion 15 of the conductive liner 14 rests directly on the heating element 13. The bottom edge 21 of the cup sleeve 18 is at this time suspended in the annular region 41 radially disposed between the heating element 13 and the adjacent portion of the base 35, so that the cup 10 is supported on the warmer entirely by engagement of the heating element with the liner bottom portion 15. The relative radial dimensions of the heating element 13, the cup bottom edge 21, and the surrounding circumferential portion within the upper face 36 of the base 35, are chosen so that the cup bottom edge 21 cannot contact the heating element 13 by laterally sliding the bottom portion 15 on the heating element. In this manner, the sleeve 18 is protected against melting or other heat damage due to inadvertent misplacement of the cup on the warmer.

Considering now the operation of the disclosed embodiment, a desired hot beverage such as coffee or hot chocolate is poured into the cup insert 28, assumed to be already inserted into the cup 10. The cup 10 is then placed on the warmer 11 as shown in FIG. 2, and electricity is supplied to the heating element 13 by turning on the in-line switch 42 associated with the power cord 43 leading to the heating element. Heat from the heating element 13 is applied directly through the bottom portion 15 of the thermally-conductive metal liner 14, and this heat in turn is transferred through the relatively thin wall of the cup insert 28 to maintain the temperature of the hot beverage previously placed in the cup insert. It will be appreciated that the heating capacity of the heating element 13 preferably is selected to provide only sufficient heat to warm and maintain the desired consumption temperature of a beverage which is already heated when poured into the cup, so that the heating element 13 may be relatively low-powered. In this manner, the beverage in the cup will be maintained indefinitely at a desired hot drinking temperature. A person can remove the cup from the warmer from time to time, drinking the beverage and then returning the cup to the warmer to keep the remaining beverage warm. As the cup 10 rests in the warmer 11, heat from the heating element 13 rises to occupy the open annular regions 30 and 31, further minimizing unwanted cooling of the beverage by thermal conduction through the cup wall. Moreover, the warmer 11 provides a relatively stable and tip-resistant support for the cup 10, due to the lower edge 21 of the cup being disposed slightly below the upper face 36 of the base.

While this invention has been described in detail with particular reference to a preferred embodiment thereof, it will be understood that variations and modifications can be made within the spirit and the scope of the invention as described hereinbefore and as defined in the appended claims.

I claim:

1. A cup for receiving a warm beverage or the like, comprising:
   a heat conductive liner including a bottom portion and a wall portion extending upwardly from said bottom portion;
   a nonconductive sleeve engaging and surrounding said heat conductive liner so that heat from within the liner is poorly conducted to the sleeve;
   said nonconductive sleeve being spaced apart from said bottom portion so as to expose the bottom portion for direct contact with a heat source, whereby heat is supplied from the heat source to the conductive liner and its contents;

said nonconductive sleeve comprising a nonconductive annular shell defining an open top end and an open bottom end;

said heat conductive liner having an open upper end of the wall portion mounted within said annular shell below the open top;

at least a lower portion of said heat conductive liner extending from said bottom portion upwardly toward said open upper end being spaced inwardly from said annular shell to define an open annular space between the annular shell and the lower portion of the heat conductive liner; and said bottom portion of the heat conductive liner being spaced inwardly and apart from said open bottom end of the nonconductive annular shell, whereby the heat conductive liner can be in direct contact with a heat source without subjecting the shell bottom end into the heat source.

2. A cup as in claim 1, wherein:

the bottom portion of the heat conductive liner is spaced above the open bottom end of the annular shell, so that the bottom end of the annular shell can surround the heat source directly contacted by said bottom portion of the heat conductive liner.

3. A cup as in claim 1, wherein:

said annular shell is an outer shell;

said nonconductive sleeve further comprises an inner shell joining the inner shell at said open top end, and extending downwardly within the outer shell to meet said open upper end of said heat conductive liner; and said inner shell being spaced apart from said outer shell so as to define an annular open region between outer and inner shells.

4. A cup as in claim 3, wherein:

said inner shell is tapered inwardly from said open top end to said open upper end of the heat conductive liner; and the wall portion of the heat conductive liner likewise tapers inwardly from said open upper end to said bottom portion, so that the inner shell and heat conductive liner together form a tapered receptacle configured to receive a disposable cup insert in close heat transfer contact with the heat conductive liner.

5. Beverage warming apparatus comprising:

a cup having a heat conductive liner including a bottom portion and a wall portion extending upwardly from said bottom portion;

a nonconductive sleeve engaging and surrounding said heat conductive liner;

said nonconductive sleeve being spaced apart from said bottom portion and from at least part of said wall portion so as to define an open heat retaining space between the heat conductive liner and the nonconductive sleeve; and having a bottom end open to expose the conductive bottom portion for direct contact with a warming heat source without subjecting the nonconductive sleeve to the heat source;

a warmer configured to removably receive and support said cup;

said warmer having heating means operative to apply heat directly to the heat conductive bottom portion of said cup when received on the warmer so as to warm the contents of the cup; and also having means defining an annular region surrounding said heating means to receive said bottom end of said nonconductive sleeve, so that the heat conductive bottom portion is heated while the nonconductive sleeve bottom end is maintained out of contact with said heating means.

6. Apparatus as in claim 5, wherein:

the bottom portion of the heat conductive liner is spaced above and inwardly from the open bottom end of the nonconductive sleeve;

said heating means comprises a heated surface for supporting the conductive bottom portion of said cup liner; and said open bottom end of the nonconductive sleeve is received in said annular region out of contact with said heated surface, so that heat from said heating means can warm the air in said open heat retaining space between the conductive liner and the nonconductive sleeve as the cup is supported on the warmer.

7. Apparatus as in claim 6 further comprising:

means surrounding said annular region of the warmer to laterally engage said sleeve bottom end when the cup is supported on the warmer, so as to prevent lateral displacement which would place the bottom end in contact with said heated surface of the warmer.

8. A cup for receiving a warm beverage or the like and intended for placement on a heat source to heat the beverage, comprising:

a heat conductive liner including a bottom portion and a wall portion extending upwardly from said bottom portion;

a nonconductive sleeve which may be damaged by contact with the heat source, said sleeve having an open bottom end and engaging and surrounding said heat conductive liner so that heat from within the liner is poorly conducted to the sleeve;

said nonconductive sleeve being spaced outwardly and apart from said bottom portion of said liner so as to expose the bottom portion of the liner for direct contact with a heat source, whereby heat is supplied from the heat source to the conductive liner and its contents;

said bottom portion of the conductive liner being spaced inwardly and apart from the surrounding bottom end of said nonconductive sleeve so as to define a heat retaining space between the conductive bottom portion and the nonconductive sleeve; and said heat retaining space being open in the region between the bottom portion of the conductive liner and the bottom end of the nonconductive sleeve, so that the bottom portion of the liner can be disposed in direct contact with a heat source without subjecting the bottom end of the nonconductive sleeve to damaging contact with the heat source.

9. A cup as in claim 8, wherein:

the bottom portion of the heat conductive liner has a bottom end spaced above said open bottom end of the nonconductive sleeve, so that the bottom end of the nonconductive sleeve can surround but not contact the heat source directly contacted by said bottom end of the heat conductive liner.

* * * * *